United States Patent [19]
Gottlieb et al.

[11] Patent Number: 6,016,542
[45] Date of Patent: Jan. 18, 2000

[54] DETECTING LONG LATENCY PIPELINE STALLS FOR THREAD SWITCHING

[75] Inventors: Robert Steven Gottlieb, Sunnyvale; Michael Paul Corwin, Palo Alto, both of Calif.

[73] Assignee: Intel Corporation, Santa Clara, Calif.

[21] Appl. No.: 09/001,552

[22] Filed: Dec. 31, 1997

[51] Int. Cl.[7] ........................................... G06F 9/38
[52] U.S. Cl. .................. 712/225; 712/216; 712/219; 712/23; 712/24; 712/42; 712/228
[58] Field of Search .................. 712/1, 23, 24, 712/200, 216, 225, 228, 219, 42; 711/154

[56] References Cited

U.S. PATENT DOCUMENTS

| | | | |
|---|---|---|---|
| 5,535,361 | 7/1996 | Hirata et al. | 711/145 |
| 5,761,515 | 6/1998 | Barton, III et al. | 711/118 |
| 5,809,450 | 9/1998 | Chrysos et al. | 702/186 |
| 5,839,709 | 11/1998 | Larsen et al. | 709/107 |

FOREIGN PATENT DOCUMENTS 0 747 816 A2  12/1996  European Pat. Off. .

OTHER PUBLICATIONS

Loikkanen et al., "A Fine–Grain Multithreading Superscalar Architecture," *Proceedings of the 1996 Conference on Parallel Architectures and Compilation Techniques*, IEEE, pp. 163–168. Oct. 20–23, 1996.

Agarwal et al., "Sparcle: An Evolutionary Processor Design for Large–Scale Multiprocessors," *Micro*, IEEE, vol. 13, Iss. 3, pp. 48–61, Jun. 1993.

Byrd et al., "Multithreaded Processor Architectures," *Spectrum*, IEEE, pp. 38–46, vol. 32, Iss. 8, Aug. 1995.

Bolychersky et al., "Dynamic Schedulling in RISC Processors Architectures," *Proceedings on Computers and Digital Techniques*, IEE, vol. 143, Iss. 5, pp. 309–317, Sep. 1996.

"Simultaneous Multithreading: A Platform for Next–Generation Processors", Eggers et al., Dept. of Computer Science and Engineering, Seattle, WA, pp. 1–15.

Compilation Issues for a Simultaneous Multithreading Processor Lo, et al., Dept. of Computer Science and Engineering, Seattle, WA, 2 pp.

"Converting Thread–Level Parallelism To Instruction–Level Parallelism Via Simultaneous Multithreading", Lo, et al., Dept. of Computer Science and Engineering, Seattle, WA, pp. 1–25

"Simultaneous Multithreadings: Maximizing On–Chip Parallelism", Tullsen, et al., Dept. of Computer Science and Engineering, Seattle, WA, pp. 1–12.

"Exploiting Choice: Instruction Fetch and Issue on an Implementable Simultaneous Multithreading Processor", Tullsen, et al., Dept. of Computer Science and Engineering, Seattle, WA, pp. 1–12.

Increasing Superscalar Performance Through Multistreaming:, Yamamoto, et al., Proceedings of the IFIP WG10.3 Working Conference on Parallel Architectures and Compilation Techniques, pp. 1–10.

*Primary Examiner*—William M. Treat
*Attorney, Agent, or Firm*—Leo V. Novakoski

[57] ABSTRACT

An apparatus is provided that operates in conjunction with a processor having registers and associated caches and a memory. A load management module monitors loads that return data to the registers, including bus requests generated in response to loads that miss in one or more of the caches. A cache miss register includes entries, each of which is associated with one of the registers. A mapping module maps a bus request to a register and sets a bit in a cache miss register entry associated with the register when the bus request is directed to a higher level structure in the memory system.

12 Claims, 6 Drawing Sheets

DETECTING LONG LATENCY PIPELINE STALLS FOR THREAD SWITCHING

BACKGROUND OF THE INVENTION

1. Field of the Invention

The present invention relates to the field of computers, and in particular, to processors capable of concurrently processing multiple threads of instructions.

2. Background Art

Modern high-performance processors are designed to execute a large number of instructions per clock. To this end, they typically include extensive execution resources. Often, these resources are not fully utilized across the target applications of interest. For example, processor execution is frequently marred with stalls for instruction fetches, data cache misses, unresolved data-dependencies and branch latencies. On application workloads that stress the memory system, the latency of delivering instructions and data from the next several levels of memory can be extremely high (100–200 clock cycles). This leads to long pipeline stalls, which leave execution resources on the chip under-utilized. On some processors, over 30% of the application time spent on OLTP-TPC-C (an on-line transaction processing benchmark) is spent waiting for main memory to return instructions or data to the processor.

One proposed solution to exploit under-utilized resources enhances the processor to execute instructions from multiple process threads simultaneously. This solution assigns processor resources to one or more new threads when a currently executing thread stalls waiting for dependent operations. Such simultaneous multi-threading processors can control resource utilization at the single instruction slot level. Another approach to increasing resource utilization implements a more coarse grained form of multi-threading. Coarse grained multi-threading switches control of the processor from the currently executing (first) thread to a new (second) thread when the first thread initiates a long latency operation (thread switch condition). The first and second threads may be different threads in the same task or they may belong to different tasks. Switching between threads in this manner reduces the likelihood of long pipeline stalls by allowing the second thread to execute while the long latency operation of the first thread completes in the background.

Switching processor resources from one thread to another may incur a performance penalty, since it takes time to flush or drain the pipeline of instruction from the current thread, save the thread's architectural state, and provide instructions from the new thread to the processor resources. These steps can take tens of clock cycles (on the order of 20 to 40 clock cycles) to complete. Coarse-grained multi-threading enhances performance only when the processor delay attributable to the thread switch condition is greater than the delay of the thread switching operation.

Various events have been proposed for triggering thread switches. For example, long latency memory operations, such as loads that miss in a processor's caches, may be used to trigger thread switches. However, not all such loads actually stall the pipeline, and even those operations that do stall the pipeline may not delay execution sufficiently to justify the thread switch overhead. If the thread switch condition is not selected carefully, unnecessary thread switches can reduce or eliminate any performance advantage provided by multi-threading.

Thus, there is a need for systems capable of identifying operations that are likely to stall the processor for an interval that is sufficiently longer than the latency of the thread switching process to justify the thread switch.

SUMMARY OF THE INVENTION

The present invention is a system for identifying those processor stalls that are likely be of sufficient duration to justify switching the processor to a new thread.

The present invention operates in conjunction with a processor having registers and an associated memory system that includes one or more caches and a main memory. A load management module monitors loads that return data to the registers, including bus requests generated in response to loads that miss in one or more of the caches. A cache miss register includes entries, each of which is associated with one of the registers. A mapping module maps a bus request to a register and sets a bit in a cache miss register entry associated with the register when the bus request is directed to a higher level structure in the memory system.

In one embodiment of the invention, a thread switch is indicated when an instruction attempts to access data in a register for which a bit in the cache miss register is set.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

Figure 1:
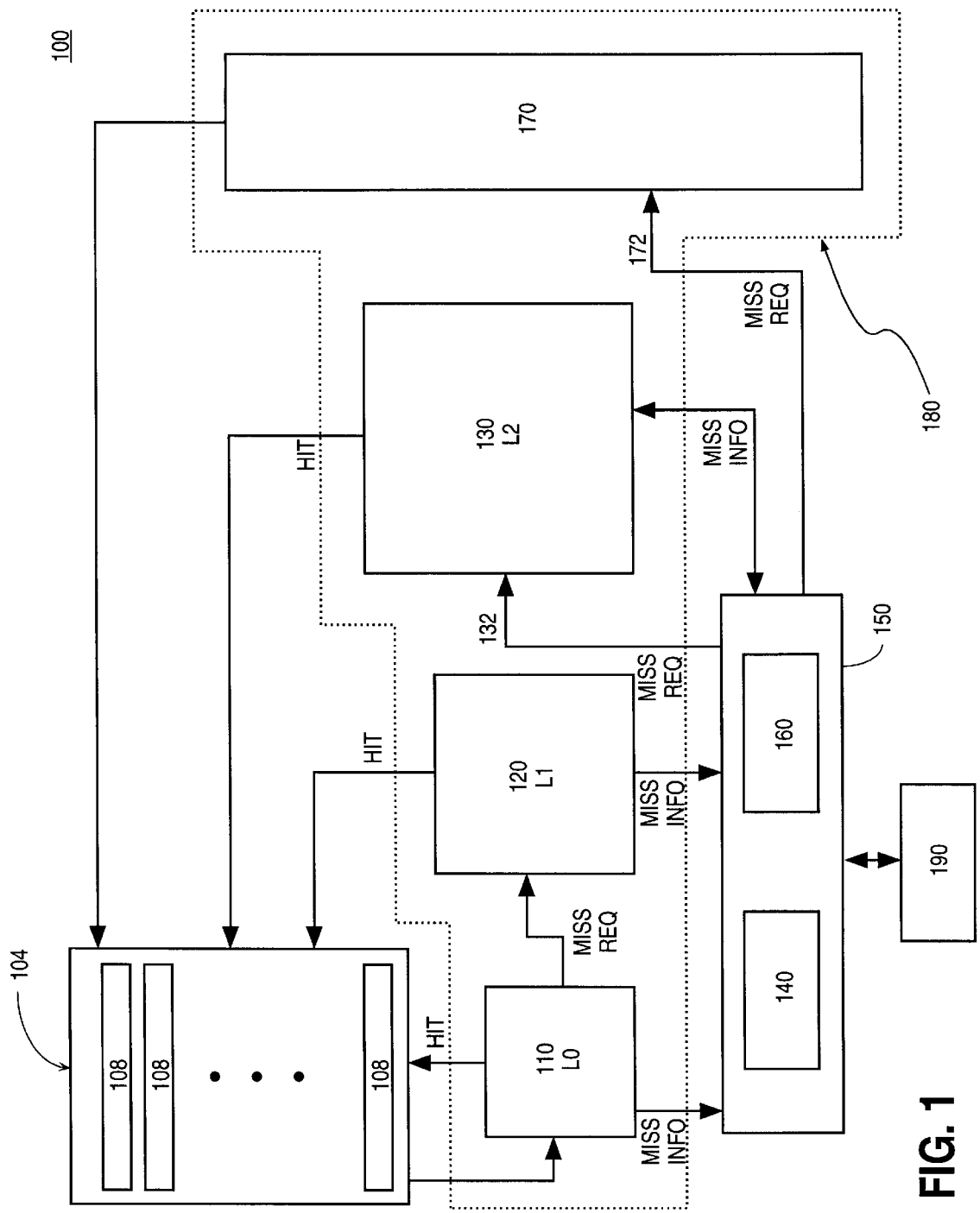
FIG. 1 is a block diagram of memory system including a cache management module, a bus management module, and a merging module in accordance with the present invention.

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

Coarse grained multi-threading can provide significant performance advantages when thread switches are triggered for those operations that would otherwise stall the processor's pipeline for an interval that is significantly longer than the time required to switch threads. An exemplary thread switching processes may require on the order of 30 cycles to flush or drain the instructions of the current thread from the pipeline, save the thread's architectural state information, and retrieve instructions from the newly scheduled thread. Swapping out a thread when it stalls the pipeline for a short period, e.g. 50 clock cycles, or when it launches a long latency operation that never stalls the pipeline provides little or no performance benefit. If thread switches are generated for these events, the processor's performance can actually be reduced.

Operations that trigger thread switches (thread switch events) ideally reflect both the latency of the operation and the likelihood that the pipeline will stall waiting for the operation to complete. Load operations that return data from the memory system ("loads") have a range of latencies, depending on which part of the memory hierarchy provides the data. Loads that hit in the caches of a processor system typically take between 2 and 30 clock cycles to return data to the core pipeline. On the other hand, loads that must access the data from main memory can have latencies on the order of 200 clock cycles. Tracking the progress of a load in the memory system is a first step in identifying suitable thread switch events.

Conventional processors typically support only limited tracking of load operations. For example, many processors include a scoreboard that tracks the availability of data in each register of a register file. While scoreboards indicate if a particular register is waiting for data, they do not indicate how long the wait is likely to be. Once the data request enters the memory system, it is often tracked by modules that do not communicate with the scoreboard. The fact that data is not available in a register says little about the likelihood or duration of a pipeline stall attributable to the unavailable data.

As noted above, a long latency operation does not, by itself, mean that the pipeline will stall. Pipeline stalls only occur if the load does not return the requested data before the instruction that uses (consumes) the data issues. If such an instruction issues before the data is available, the pipeline stalls and remains stalled until the requested data is returned. For a load that hits in one of the processor's caches, the stall will typically be less than 30 cycles, since there is usually a delay of a couple of clock cycles between requesting the load and issuing the instruction that consumes the data provided by the load. A thread switch operation that consumes 20 to 30 clock cycles is not justified in these cases. On the other hand, load latencies of 200 clock cycles or more for accesses to main memory are likely to stall the pipeline for significantly more than 30 clock cycles, since the instruction that consumes the data is liable to issue well within 200 clock cycles of the load. However, pipeline stalls are still not guaranteed in these cases. For example, the thread could enter a long loop before the consuming instruction issues.

The present invention is a system and method for efficiently detecting events that lead to long latency pipeline stalls from among the many different types of operations that may stall a pipeline. In one embodiment of the invention, a thread switch is triggered when a load by the currently executing thread misses in the processor's caches and an instruction requiring the data returned by the load issues. Various tables are employed to track requests to different portions of the memory hierarchy and to track the status of registers for which requested data is destined. One such table identifies each register awaiting data for which a bus request to main memory has been generated. A thread switch event is indicated if an instruction attempts to access data from a register identified in the table. In this way, a thread switch is generated only for those loads that stall the pipeline and are likely to keep it stalled for periods in excess of the thread switch latency.

Referring now to FIG. 1, there is shown a block diagram of a system 100 including an apparatus suitable for detecting events that are likely to lead to long latency pipeline stalls (thread switch events). In the disclosed embodiment, system 100 includes a memory system 180, a load tracking module 150, a mapping module 190, and a register file 104 comprising multiple registers 108. Memory system 180 has a hierarchy of memory structures including an L0 cache 110, an L1 cache 120, an L2 cache 130, and a main memory 170. Load tracking module 150 includes a cache management module 140 and a bus management module 160. Although system 100 is shown with three levels of cache, the present invention does not require a specific number of caches in the memory hierarchy.

Load tracking module 140 tracks accesses to caches 110, 120, 130, and main memory 170 and stores data for mapping load requests to specific registers 108 of register file 104. Bus management module 160 tracks the status of bus requests generated in response to load requests. Depending on the configuration of the processor and memory system 180, bus management module 160 may track bus requests on more than one bus. For example, in certain processors, cache 130 is located off the processor chip and communicates with the processor through a back side bus (BSB), e.g. connection 132. In these systems, a separate front side bus (FSB), e.g. connection 172, supports bus cycles to main memory. Exemplary systems are those based on the Pentium® Pro and Pentiumo® II processors, available from Intel Corporation of Santa Clara, Calif. In these systems, cache 130 may be accessed through a BSB 132 with access latencies on the order of 30 clock cycles.

Where system 100 includes multiple buses, e.g. BSB 132 and FSB 172, bus management module 160 tracks bus requests on both buses. In embodiments for which cache 130 is on the processor chip, connection 132 may be a queue between cache 120 and cache 130. In these embodiments, cache management system 140 may be sufficient to track loads to cache 130.

Mapping module 190 includes tables for mapping bus requests to specific registers 108 as well as circuitry for determining which registers 108 are awaiting data for which a bus request to main memory 170 has been generated. Mapping module 190, cache management module 140, and bus management module 160 are shown as separate modules for clarity, but this configuration is not required for the present invention. For example, the tables and circuitry of mapping module 190 may be distributed between cache management module 140 and bus management module 160, and the circuitry of cache management module 140 and bus management module 160 may be combined in whole or in part.

The present invention is illustrated for the case in which accesses to main memory 170 are the only accesses in memory system 180 that have latencies long enough to merit consideration of a thread switch. However, other memory systems may include additional cache levels between cache 130 and main memory 170. Depending on their latencies, it may be that accesses to one or more of these additional caches have sufficient latencies to merit consideration of a thread switch. Persons skilled in the art, having the benefit of this disclosure, will recognize the modifications of the illustrated embodiment necessary to extend the invention to these cases.

Figure 2:
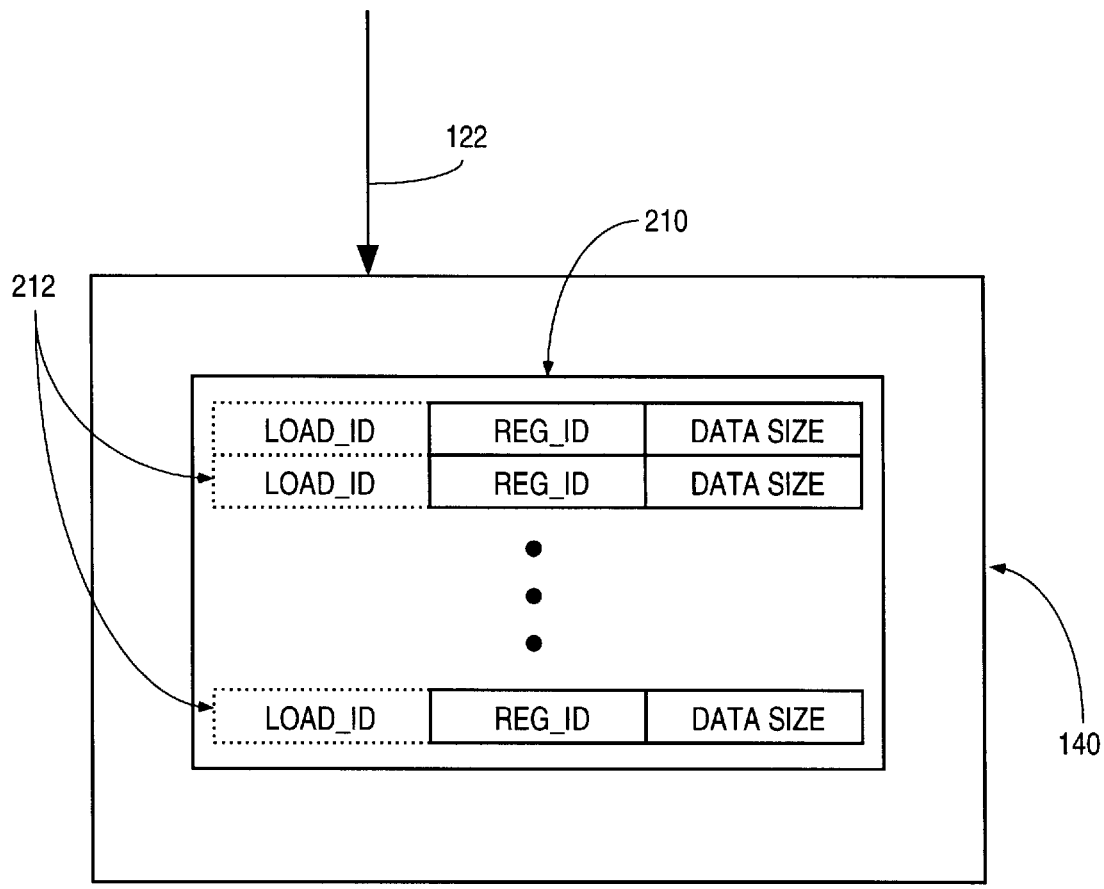
FIG. 2 is a block diagram of the cache management module of FIG. 1.

FIG. 2 shows an embodiment of cache management module (CMM) 140. In the disclosed embodiment, CMM 140 includes a load miss buffer (LMB) 210. In the disclosed embodiment of memory system 180, where cache 130 is accessed through BSB 132, a request that misses in cache 120 will require some type of bus request to obtain the targeted data. Each entry 212 of LMB 210 is indexed by a load identifier (LOAD_ID) to simplify tracking. Associated with each LOAD_ID is a register identifier field (REG_ID) that identifies a register 108 for which the requested data is destined. Typically, each entry 212 of LMB 210 tracks the size of the data request in a separate field (DATA_SIZE). LOAD_IDs may be specified explicitly or implicitly and are indicated by dashed lines in FIG. 2 for this reason. In the first case, LMB 210 includes a separate field for each entry 212 in which the LOAD_ID is stored. In the second case, the LOAD_ID is implicit in the order in which the REG_ID (and DATA_SIZE, if present) appear in LMB 210. The latter approach has the advantage of requiring less die area for LMB 210 than the former approach.

Figure 3:
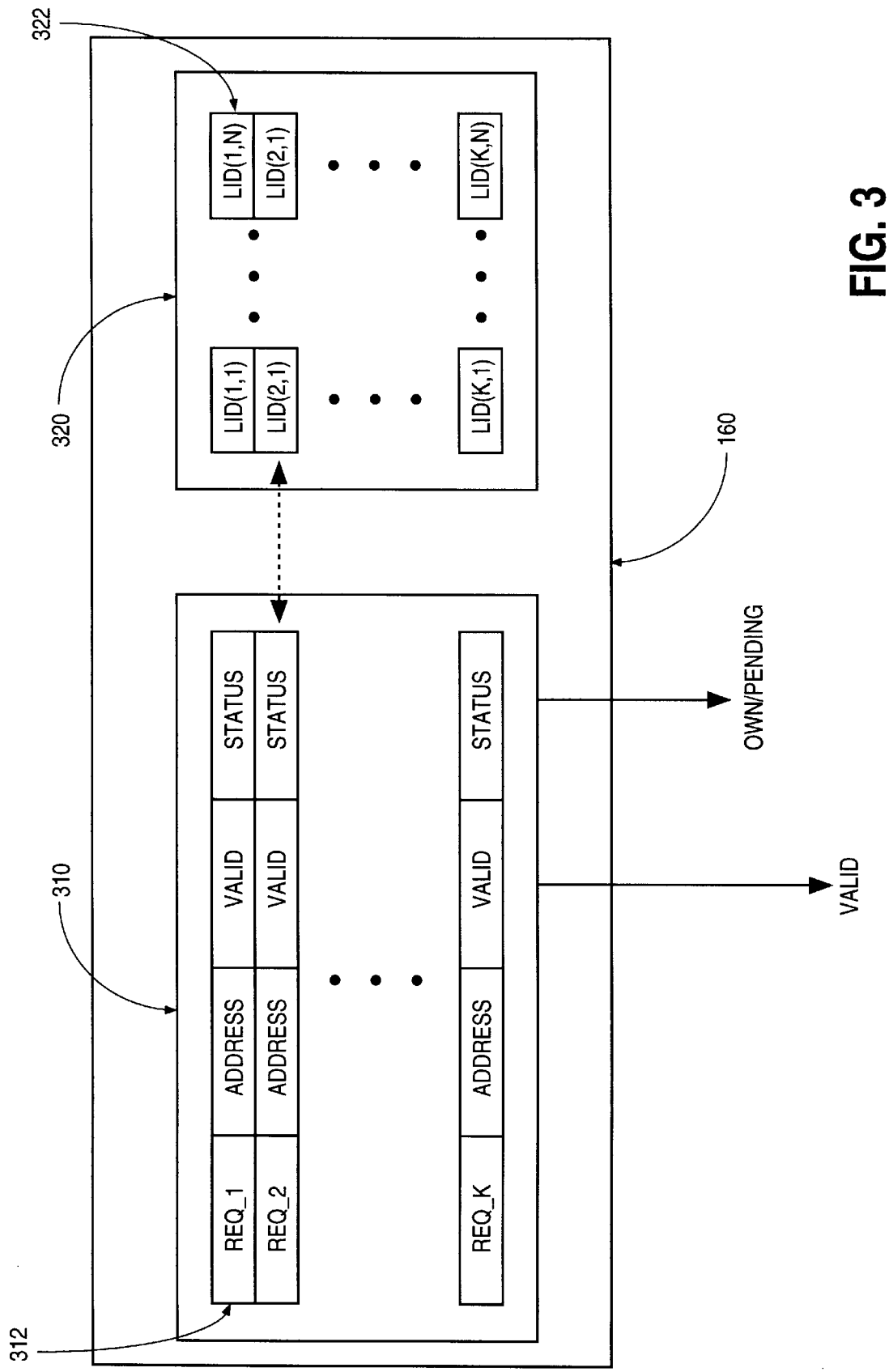
FIG. 3 is a block diagram of the bus management module of FIG. 1.

Referring now to FIG. 3, there is shown an embodiment of bus management module 160 of FIG. 1. The disclosed embodiment of BMS 160 includes a bus request queue (BRQ) 310 and an external bus logic LMB (EBLLMB) 320. BRQ 310 tracks the status of various bus requests to cache 130 (if applicable) and main memory 170. EBLLMB 320 provides mapping information between LOAD_IDs and bus requests.

BRQ 310 includes entries 312 that are indexed by a bus request identifier (REQ_ID). Each REQ_ID entry has associated fields to indicate a target memory address (ADDRESS) of the request, as well as the validity (VALID) and status (STATUS) of the request. VALID indicates whether the entry referred to by REQ_ID is still a valid bus request. STATUS indicates whether the corresponding request is earmarked for a transaction on FSB 172. In one embodiment, STATUS includes a first bit that is set to indicate that signals corresponding to REQ_ID are currently on FSB 172 and a second bit that is set to indicate that REQ_ID is waiting for a chance to assert signals on FSB 172.

EBLLMB 320 includes an entry 322 for each bus request supported by BRQ 310. Entry 322 maps each LOAD_ID to the corresponding bus request (REQ_ID) that has been generated to return the requested data. Typically, a bus cycle can return data for multiple loads (LOAD_IDs). For example, a load may request 8 bytes of data (for sixty four bit register), while a bus cycle may be able to return up to 64 bytes of contiguous data. In this case, a single bus request may access data for up to 8 different registers. EBLLMB 320 provides a mapping between the LOAD_IDs assigned to these registers, and the bus request (REQ_ID) that will return the requested data.

In one embodiment of EBLLMB 320, entries 322 are configured in the same order as those in BRQ 310, with each entry 322 identifying up to 8 LOAD_IDs. This is indicated by the dashed arrow in FIG. 3. The common ordering of entries in BRQ 310 and EBLLMB 320 eliminates the need for a REQ_ID field in EBLLMB 320 to index entries 322.

Figure 4:
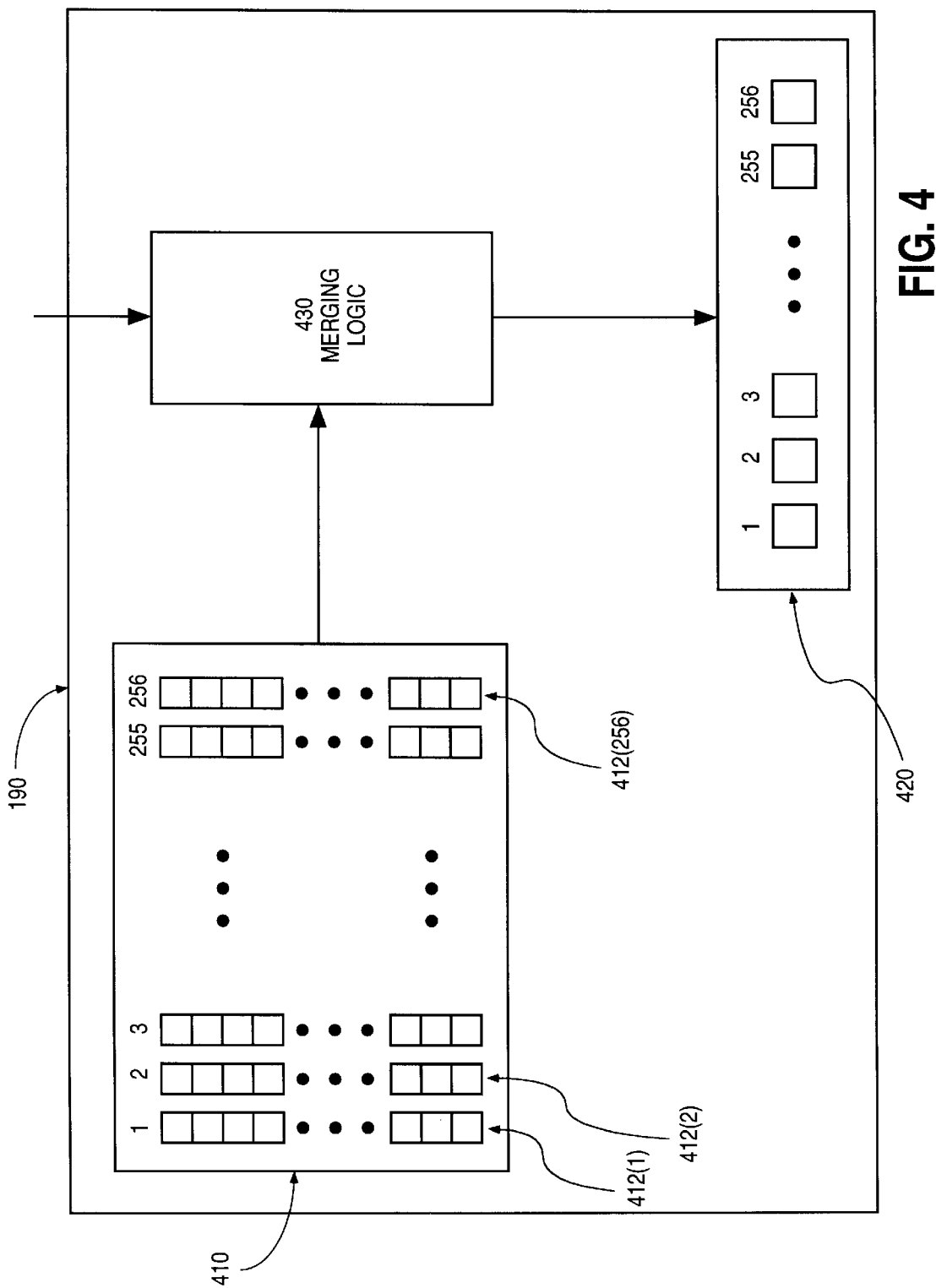
FIG. 4 is a block diagram of the mapping module of FIG. 1.

FIG. 4 shows one embodiment of mapping module 190. The disclosed embodiment of mapping module 190 includes a bus cycle register table 410, a cache miss register 420, and merging logic 430. Merging logic 430 generates entries for cache miss register 420 from BCRT 410 and BRQ 210.

In the disclosed embodiment, BCRT 410 identifies which registers are currently awaiting data to be returned from main memory 170 and cache 130, i.e. the memory structures that are accessed through bus requests. In the disclosed embodiment of the invention, where an entry is generated in LMB 210 for each load that misses in cache 120, BCRT 410 identifies registers that are currently awaiting data to be returned from cache 130 or main memory 170. BCRT 410 thus provides a mapping between REQ_IDs (outstanding bus requests to cache 130 and main memory 170) and REG_IDs (registers to which requested data will be returned).

In the disclosed embodiment of BCRT 410, each register 108 of register file 104 is represented by a column 412 of entries, one entry for each REQ_ID supported in BRQ 310. As with EBLLMB 320, configuring these entries in the same order as those in BRQ 310, eliminates the need for a field to index the entry to REQ_ID. In one embodiment, each entry is a single bit, which is set if the corresponding bus request (REQ_ID) is retrieving data destined for the register (REG_ID). The entries of BCRT 410 may be derived from EMBLLMB 320 of bus management module 160 (which maps LOAD_IDs to REQ_IDs) and LMB 210 of cache management system 140 (which maps REG_IDs to LOAD_IDs) using relatively simple circuitry.

Merging logic 430 operates on inputs from BCRT 410 and BRQ 310 to maintain in cache miss register 420 a scoreboard identifying a subset of the registers in BCRT 410 that are awaiting data to be returned by bus requests destined for or already on FSB 172. For each REG_ID having an entry set in BCRT 410, merging logic determines whether the corresponding bus request is valid, and is slated for access to FSB 172. M merging logic 430 uses STATUS from BRQ 310 to determine whether the identified request has either asserted signals on FSB 172 or is awaiting an opportunity to assert signals on FSB 172.

Figure 5:
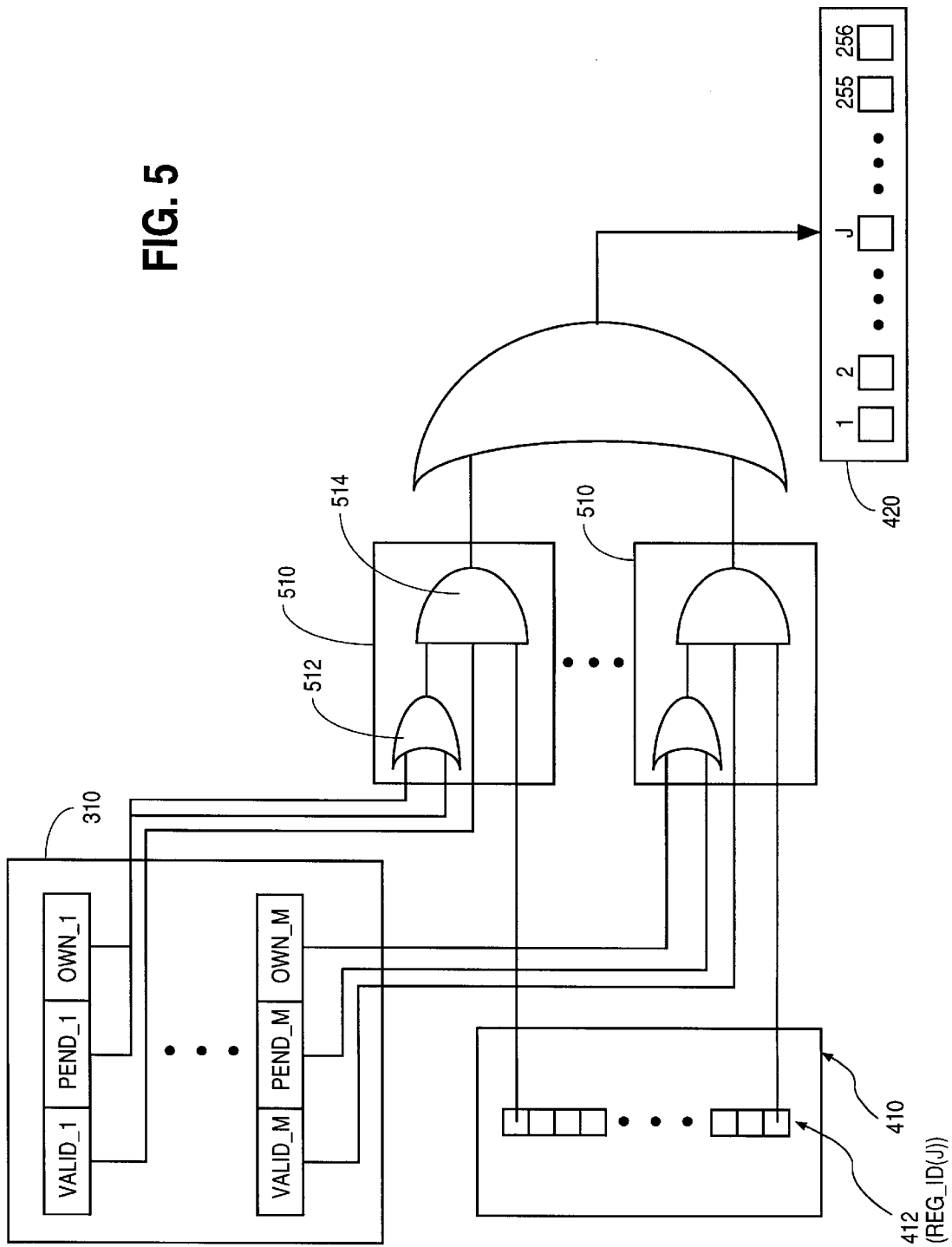
FIG. 5 is a circuit diagram of the merging logic of FIG. 4.

Referring now to FIG. 5, there is shown a circuit diagram of merging logic 430. Merging logic 430 includes m-cache miss detectors 510, one for each of the m-REQ_ID entries supported in BRQ 310. Detectors 510 include an OR gate 512 that detects when a the corresponding REQ_ID has missed in the processor's caches, as indicated by set own/pending bits in associated entry 312. AND gate 514 ensures that the entries indexed by REQ_ID are valid, and that register (REG_ID) is destined to receive data from the request, REQ_ID. If these conditions are true for a specified register (REG_ID) with respect to any valid bus request (REQ_ID) in BRQ 310, the register is waiting for data to be returned from main memory 170, and a corresponding bit is set in CMR 420. Merging logic 430 is coupled to monitor the same information for each register (REG_ID) (column 402) in BCRT 410.

CMR 420 thus identifies which of registers 108 are awaiting data that is being accessed from main memory 170. Since main memory accesses are relatively long latency operations, an instruction that consumes data in a register that is waiting for the data to be returned from main memory 170, i.e. a register in CMR 420 for which the bit is set, will likely stall the processor pipeline for a significant period.

In accordance with the present invention, the entries of CMR 420 are compared with register read requests to register file 104. When an instruction attempts to read a register for which the bit in CMR 420 is set, a thread switch operation is triggered. Since the data is unavailable in the register, and will not be available until its returned from main memory 170, the consuming instruction will likely stall the processor for significantly longer than the 30 cycle thread switch latency.

Figure 6:
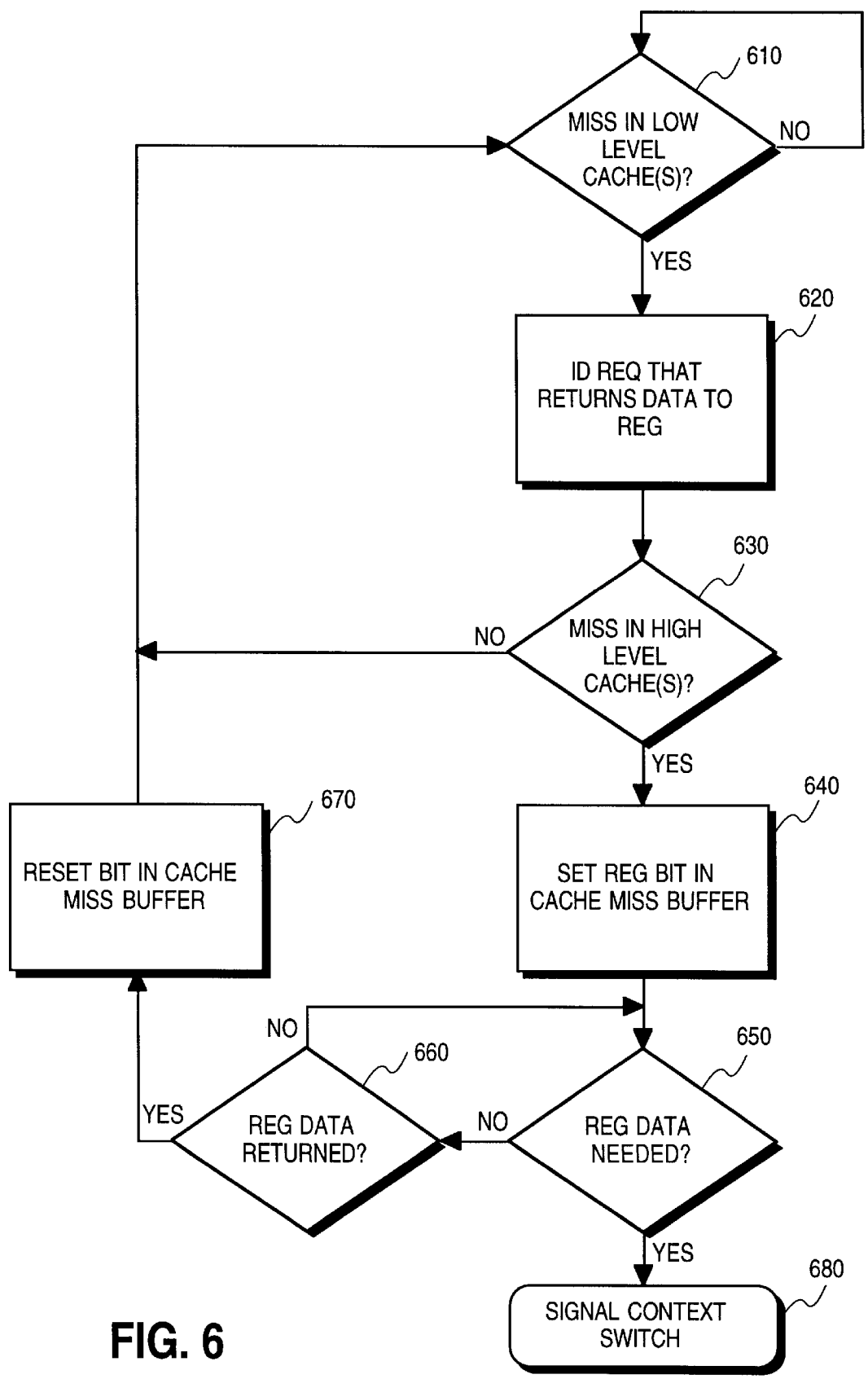
FIG. 6 is a flowchart of a method in accordance with the present invention for detecting long latency pipeline stalls.

Referring now to FIG. 6, there is shown a flowchart of a method 600 in accordance with the present invention for triggering thread switches. Method 600 is initiated when it is determined 610 that a load operation to a register misses in a low level cache(s). Here, low level caches are those that do not require bus cycles to retrieve data. When such a miss is detected 610, a bus request (REQ) that retrieves the data to the register is identified 620. If the REQ hits 630 in the higher level cache, method 600 awaits 610 the next miss in a low level cache.

If the REQ misses 630 in the higher level cache, a bit corresponding to the register is set 640 in a cache miss buffer, and a register read queue is checked 650 to determine whether an instruction has tried to access the data. If an instruction tries to access 650 the data, a thread switch condition is indicated 680. If no instruction tries to access the data, it is determined 660 whether the data has been returned from main memory. If it has been returned 660, the register bit in cache miss buffer is reset and method 600 returns to step 610. If the data has not been returned 660, method 600 checks an instruction has tried to access the data.

There has thus been provided a system and method for detecting long latency pipeline stalls in a processor. The present invention tracks the availability of data in specific registers and the status of bus requests to various memory structures. Circuitry is provided to map the registers to the bus requests and monitors the status of bus requests for indications that a long latency operation has been initiated. When a long latency operation such as a miss in the processor's caches, is detected, a register read queue is monitored to determine whether an instruction needs the data being accessed by the long latency operation. A thread switch condition is indicated when an instruction tries to access a register which is awaiting data from a long latency read operation.

The present invention has been described with respect to specific embodiments of register and request tracking data structures and monitoring circuitry. The scope of the present invention is not limited to these specific embodiments but is limited only by the appended claims.

What is claimed is:

1. An apparatus for detecting a thread switch condition in a processor having one or more processor registers and an associated memory system including one or more caches and a main memory, the apparatus comprising:

a load tracking module, the load tracking module to monitor loads that return data to the processor registers, including bus requests generated in response to loads that miss in one or more of the caches;

a cache miss register including entries, each of which is associated with one of the processor registers; and a mapping module coupled to the load tracking module and the cache miss register, the mapping module to map a bus request to a register and to set a bit in a cache miss register entry associated with the register when the bus request is directed to a higher level structure in the memory system.

2. The apparatus of claim 1, wherein the load tracking module includes a load miss buffer, the load miss buffer having an entry for each load that misses in one of the caches, the entry indicating a processor register to which the load returns data.

3. The apparatus of claim 1, wherein the tracking module includes a bus request table, the bus request table having an entry for each request to access data through a bus.

4. The apparatus of claim 3, wherein the associated memory system includes a level two cache that is accessed by a first bus and the main memory is accessed by a second bus and wherein the bus request table tracks requests to the first and second buses.

5. The apparatus of claim 4, wherein the mapping module sets a bit in an entry of the cache miss register entry associated with a register when the bus request is directed to the second bus.

6. The apparatus of claim 1, wherein the higher memory structure is the main memory.

7. An system for detecting a thread switch condition in a processor having one or more processor registers, one or more caches, and an associated memory, the apparatus comprising:

a cache management module to monitor loads that return data to the one or more processor registers;

a bus management module to monitor bus requests generated in response to load misses in the one or more caches;

a cache miss register having an entry for each of the one or more processor registers; and a mapping module coupled to the cache miss register, the cache management module, and the bus management module to map a bus request to a processor register and set a bit in an entry associated with the processor register when a bus request to the memory is mapped to the register.

8. The system of claim 7, further comprising merging logic coupled to the mapping module and a register file including the one or more processor registers, the merging logic indicating a thread switch condition when a request to the register file targets a register for which the associated cache miss register bit is set.

9. The system of claim 7, in which the cache management module includes a load miss buffer, the load miss buffer having an entry for each load that misses in one of the caches, the entry indicating a processor register to which the load returns data.

10. The system of claim 7, wherein the bus management module includes a bus request table, the bus request table having an entry for each request to access data through a bus.

11. The system of claim 10, wherein the mapping module maps a register ID associated with a load to a request ID associated with a bus request, and sets a bit in the cache miss buffer associated with the register ID when a status bit in the bus request table indicates that the associated bus request returns data from main memory.

12. The system of claim 11, wherein the mapping module includes a bus cycle register table, the bus cycle register table identifying which registers are currently awaiting data to be returned by a bus request.

* * * * *